(12) United States Patent
Song et al.

(10) Patent No.: US 7,352,663 B2
(45) Date of Patent: Apr. 1, 2008

(54) HIGH-SENSITIVITY PICKUP ACTUATOR FOR DISC DRIVE

(75) Inventors: Byung-Youn Song, Suwon-Si (KR); Hyung-Joo Kang, Seoul (KR); Dae-Jong Jang, Anyang-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 10/987,613

(22) Filed: Nov. 12, 2004

(65) Prior Publication Data

US 2005/0117469 A1 Jun. 2, 2005

(30) Foreign Application Priority Data

Nov. 13, 2003 (KR) .................. 10-2003-0080100

(51) Int. Cl.
*G11B 7/00* (2006.01)
(52) U.S. Cl. ................................... 369/44.14
(58) Field of Classification Search ............ 369/44.11, 369/44.12, 44.14, 44.15, 44.16, 44.32
See application file for complete search history.

(56) References Cited

U.S. PATENT DOCUMENTS

| | | | | |
|---|---|---|---|---|
| 5,208,703 | A | 5/1993 | Ikegame et al. | ............ 359/813 |
| 5,428,481 | A | 6/1995 | Ikegame et al. | ............ 359/811 |
| 6,724,696 | B2 * | 4/2004 | Kim et al. | ............... 369/44.16 |
| 6,768,601 | B2 * | 7/2004 | Ju | ............................. 359/824 |

OTHER PUBLICATIONS

Japanese Patent Application No. 09-136596 with Publication date of Dec. 18, 1998 (w/ English Abstract page).
Japanese Patent Application No. 09-347733 with Publication date of Jul. 9, 1999 (w/ English Abstract page).
Japanese Patent Application No. 10-082025 with Publication date of Oct. 15, 1999 (w/ English Abstract page).
Japanese Patent Application No. 2000-287406 with Publication date of Jun. 22, 2001 (w/ English Abstract page).
Japanese Patent Application No. 2001-043015 with Publication date of Aug. 30, 2002 (w/ English Abstract page).
Japanese Patent Application No. 2001-371154 with Publication date of Jun. 20, 2003 (w/ English Abstract page).
Japanese Patent Application No. 2002-373435 with Publication date of Dec. 26, 2002 (w/ English Abstract page).
Japanese Patent Application No. 2003-002569 with Publication date of Jul. 18, 2003 (w/ English Abstract page).

(Continued)

*Primary Examiner*—Nabil Hindi
(74) *Attorney, Agent, or Firm*—Monica H. Choi

(57) ABSTRACT

A pickup actuator of a disc drive includes a pair of magnets, each facing a respective side of a bobbin and having a middle region with a first polarity and side regions with a second polarity opposite of the first polarity. The pickup actuator includes a plurality of tracking coils disposed on the respective sides of the bobbin facing the magnets. Each tracking coil has two effective coil portions with one facing the middle region and the other facing one of the side regions of the magnet, for higher sensitivity. The magnets are disposed at two sides of a bobbin for lower cost and complexity of manufacture.

24 Claims, 12 Drawing Sheets

OTHER PUBLICATIONS

Japanese Patent Application No. 2001-313635 with Publication date of Apr. 25, 2003 (w/ English Abstract page).
Korean Patent Application No. 1019990045846 with Publication date of May 15, 2001 (w/ English Abstract page).
Korean Patent Application No. 1019990045879 with Publication date of May 15, 2001 (w/ English Abstract page).
Japanese Patent Application No. 07-244457 with Publication date of Apr. 4, 1997 (w/ English Abstract page).
Korean Patent Publication No. 1020020035191 with Publication date of Nov. 5, 2002 (w/ English Abstract page).
Japanese Patent Publication No. 2002-373435 with Publication date of Dec. 26, 2002 (w/ English Abstract page).
Japanese Patent Publication No. hei 6-52014 with Publication date of Jul. 15, 1994 (w/ English Abstract page).
Japanese Patent Publication No. 09-231593 with Publication date of Sep. 5, 1997 (w/ English Abstract page).
Japanese Patent Publication No. 2000-215482 with Publication date of Aug. 4, 2000 (w/ English Abstract page).
European Patent Application No. 02255861.3 with Publication date of Jun. 4, 2003.
Japanese Patent Application No. 09136596 with Publication date of Dec. 18, 1998 (w/ English Abstract page).
Japanese Patent Application No. 2001371154 with Publication date of Jun. 20, 2003 (w/ English Abstract page).
Japanese Patent Application No. sho 61-18594 (w/ English Abstract page), no date.

* cited by examiner

HIGH-SENSITIVITY PICKUP ACTUATOR FOR DISC DRIVE

BACKGROUND OF THE INVENTION

This application claims priority to Korean Patent Application No. 2003-0080100, filed on Nov. 13, 2003, in the Korean Intellectual Property Office, the disclosure of which is incorporated herein in its entirety by reference.

1. Field of the Invention

The present invention relates generally to pickup actuators for disc drives such as optical pickup actuators, and more particularly to a pickup actuator having effective coil portions for high sensitivity.

2. Description of the Related Art

An optical pickup records and/or reproduces information on/from an optical disc within an optical disc drive. The optical pickup moves in a radial direction over the optical disc that is an optical information storage medium during such recording/reproducing.

A pickup actuator moves an objective lens of the optical pickup in tracking, focus, and/or tilt directions such that a light beam is focused on a desired spot of the optical disc. The tracking direction refers to the radial direction of the optical disc such that a light beam spot is formed at the center of a track of the optical disc. The focus direction refers to upward/downward from the optical disc for directing the light beam onto the optical disc with desired focus.

Recently, a numerical aperture (NA) of the objective lens has increased and a wavelength of the light beam has decreased for high-density optical storage devices. Such increased numerical aperture and such decreased wavelength decrease a tilt margin of the pickup actuator. Thus, the pickup actuator is desired to perform three-axis control including in a tilt direction as well as the tracking and focus directions. Such a pickup actuator is referred to as a tilt driving optical pickup actuator.

FIG. 1 shows a perspective view of an example conventional tilt driving optical pickup actuator. Referring to FIG. 1, the conventional tilt driving optical pickup actuator includes a bobbin 2 having an objective lens 1 mounted thereon, a plurality of wires 6, and a magnetic circuit that is formed at four sides of the bobbin 2 for moving the bobbin 2.

One end of each wire 6 is attached to the bobbin 2 and the other end of each wire 6 is fixed to a holder 3 mounted on a base 5. With suspension from such wires 6, the bobbin 2 is movable in the focus direction F, the tracking (i.e., radial) direction T, and a radial tilt direction $R_T$ with respect to the base 5.

A respective pair of the wires 6 may carry current for driving in each of the focus and tracking directions. In FIG. 1, wires used to carry current for driving in the tilt direction are not shown.

The conventional magnetic circuit of FIG. 1 includes a focus coil 4 wound around the bobbin 2 for moving the objective lens 1 in the focus direction F. In addition, two pairs of tracking coils 7a and 7b are disposed on the two sides of the bobbin 2 that are parallel along the tracking direction. Furthermore, each of a pair of tilt coils 9a and 9b is disposed on one of the remaining two sides of the bobbin 2.

The conventional magnetic circuit of FIG. 1 also includes magnets 10 and 11 and yokes 14, 15, and 16 at the four sides of the bobbin 2. When currents flows through the focus coil 4, the tracking coils 7a and 7b, and/or the tilt coils 9a and 9b, electromagnetic forces are generated for moving the bobbin 2 and thus the objective lens 1.

First magnets 10 are disposed on first yokes 14 for driving the bobbin 2 in the focus and tracking directions. Second magnets 11 are disposed on second yokes 16 for driving the bobbin 2 in the tilt direction. Third yokes 15 are internal yokes while first and second yokes 14 and 16 are external yokes that direct magnetic fields used for driving in the focus, tracking, and tilt directions.

Further referring to FIG. 1, when current flows through the focus coil 4, an electromagnetic force is exerted on the focus coil 4 from interaction of such current with the magnetic field of the magnets 10 to move the bobbin 2 and thus the objective lens 1 in the focus direction F. When current flows through the tracking coils 7a and 7b, an electromagnetic force is exerted on the tracking coils 7a and 7b from interaction of such current with the magnetic field of the magnets 10 to move the bobbin 2 and thus the objective lens 1 in the tracking (i.e., radial) direction T.

When current flows through the tilt coils 9a and 9b, an electromagnetic force is exerted on the tilt coils 7a and 7b from interaction of such current with the magnetic field of the magnets 11. When currents flow through the tilt coils 9a and 9b in different directions such that oppositely directed electromagnetic forces are exerted on the tilt coils 7a and 7b, the bobbin 2 and thus the objective lens 1 are moved in the radial tilt direction $R_T$.

In the conventional optical pickup actuator of FIG. 1, one side of each tracking coil 7a or 7b forms an effective coil portion on which electromagnetic force in generated, resulting in low efficiency and sensitivity of control in the tracking direction T. Additionally in the conventional optical pickup actuator, magnets are disposed on all four sides of the bobbin 2 resulting in higher cost and complexity of manufacture.

Generally, a pickup actuator for a disc drive is desired to have high control sensitivity and low cost and complexity of manufacture.

SUMMARY OF THE INVENTION

Accordingly, coils of a pickup actuator are arranged with respect to magnets having multiple regions with multiple polarities for high control sensitivity. In addition, such magnets are disposed at two sides of a bobbin for lower cost and complexity of manufacture.

According to an aspect of the present invention, a pickup actuator of a disc drive includes a pair of magnets, each facing a respective side of a bobbin and having a middle region with a first polarity and side regions with a second polarity opposite of the first polarity. In addition, the pickup actuator includes a plurality of tracking coils disposed on the respective sides of the bobbin facing the magnets. Each tracking coil has two effective coil portions, with one of the effective coil portions facing the middle region of a magnet and the other of the effective coil portions facing one of the side regions of the magnet.

In an example embodiment of the present invention, the regions of the magnet are each rectangular shaped with the side regions disposed at opposite sides of the middle region along a radial direction of the disc drive.

In another aspect of the present invention, the pickup actuator further includes a base having the magnets mounted thereon, and further includes an objective lens mounted on the bobbin for the disc drive that is an optical disc drive. The pickup actuator also includes a suspension for supporting the bobbin that is movable with respect to the base.

In a further aspect of the present invention, the pickup actuator further includes a focus coil wound around the bobbin and having two effective coil portions each facing the middle region of a respective one of the magnets. In an example embodiment of the present invention, the width of each effective coil portion of the focus coil is substantially equal to the width of the middle region of the respective one of the magnets.

In another embodiment of the present invention, the pickup actuator also includes a plurality of tilt coils wound in at least one plane that is parallel to the focus coil and that is upward and/or downward from the focus coil. In that case, each tilt coil has an effective coil portion facing the middle region of one of the magnets.

In a further aspect of the present invention, at least one of the side regions of a magnet has an extended branch fitting into the middle region of the magnet. In that case, the pickup actuator also includes a tilt coil wound around the bobbin and having two effective coil portions. Each effective coil portion of the tilt coil has a first part facing the extended branch and a second part facing the middle region adjacent the extended branch.

In another aspect of the present invention, the side regions of a magnet each have an extended branch that join to form a common area of a U-shaped structure. In that case, the pickup actuator also includes a plurality of tilt coils disposed on the respective sides of the bobbin facing the magnets. Each tilt coil has two effective coil portions, with one of the effective coil portions facing the middle region of a magnet and the other of the effective coil portions facing the common area of the U-shaped structure of the magnet.

With such tilt coils and such U-shaped structure of the magnets, the tilt coils are disposed closer to the magnets than the tracking coils in one embodiment of the present invention. Alternatively, the tilt coils are disposed further from the magnets than the tracking coils.

In a further embodiment of the present invention, the pickup actuator further includes a pair of tilt magnets facing remaining sides of the bobbin. In that case, the pickup actuator includes a pair of tilt coils each disposed on a respective one of the remaining sides of the bobbin and having effective coil portions in interaction with a respective one of the tilt magnets.

The pickup actuator of embodiments of the present invention may be applied to particular advantage when formed as part of a disc drive further including a pickup that reproduces and/or records information on an information storage medium and a servo that controls movement of the pickup. In that case, the pickup actuator moves the pickup according to control by the servo.

In this manner, the coils of the pickup actuator are arranged with respect to the multiple polarities of the magnets for high control sensitivity. In addition, such magnets may be disposed at just two sides of the bobbin for lower cost and complexity of manufacture.

The pickup actuator of embodiments of the present invention may be advantageously applied for moving an objective lens mounted on the bobbin for an optical disc drive. However, the pickup actuator of embodiments of the present invention may also be applied within any other types of disc drives.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, 11, 12, and 13 refer to elements having similar structure and/or function.

DETAILED DESCRIPTION OF THE INVENTION

Figure 1:
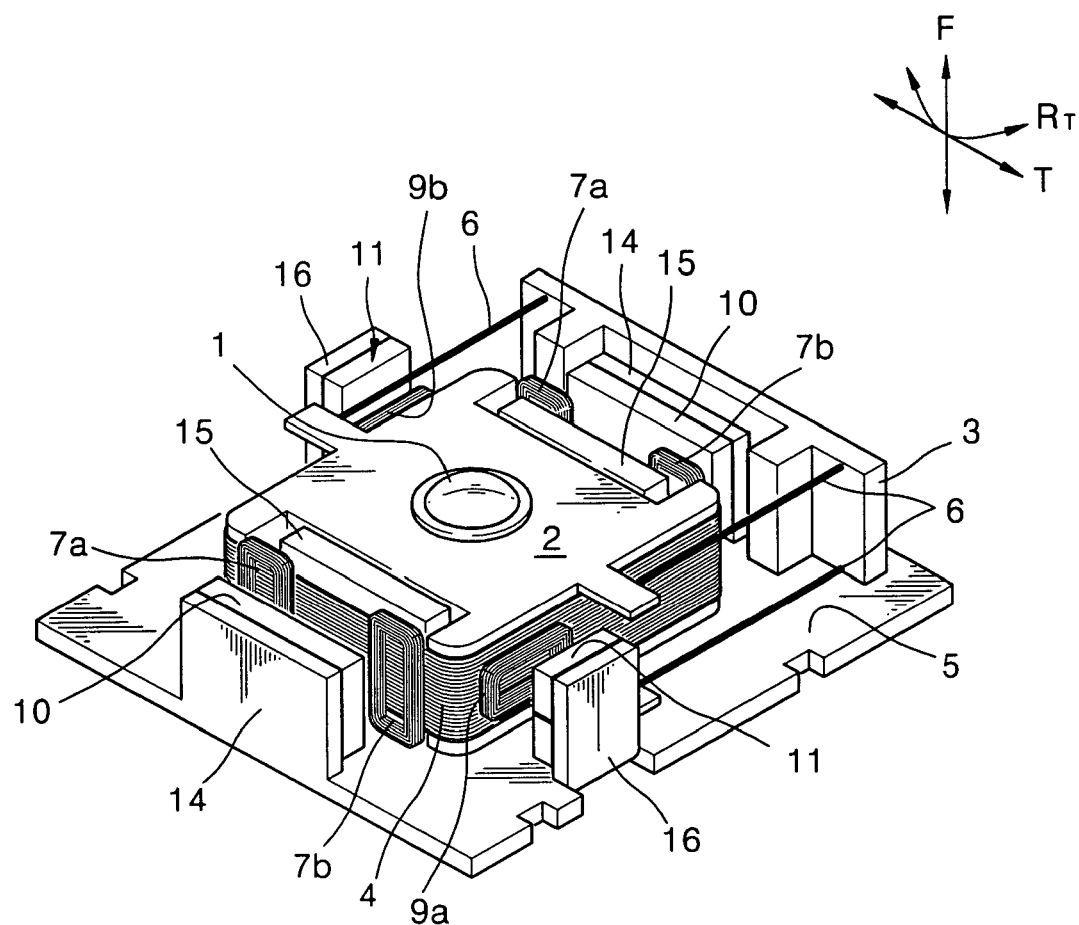
FIG. 1 is a schematic perspective view of a conventional optical pickup actuator.

Referring to FIGS. 2, 3, 4, and 5, an optical pickup actuator of an optical disc drive according to a first embodiment of the present invention includes a bobbin 31 having an objective lens 30 thereon. In addition, the optical pickup actuator includes a suspension 37 comprising four wires 37 that support the bobbin 31 while enabling the bobbin 31 to move with respect to a base 33. Each wire 37 has one end attached to the bobbin 31 and the other end attached to a holder 35 mounted on one side of the base 33.

Furthermore, the optical pickup actuator includes a magnetic circuit installed on the bobbin 31 and the base 33. The magnetic circuit includes a pair of magnets 40 that are disposed on the base 33 to face two sides 31a and 31b of the bobbin 31 that are parallel along a radial (i.e., tracking) direction of an optical disc. The magnetic circuit also includes a focus coil 45 wound around the bobbin 31. Furthermore, the magnetic circuit includes a plurality of tracking coils 47 and 49 mounted on the two sides 31a and 31b of the bobbin 31 facing the pair of magnets 40. The magnetic circuit also includes tilt coils 46 and 48 in one embodiment of the present invention.

The wires of the suspension 37 also carry current for tracking and focus control. The optical pickup actuator according to the first embodiment of the present invention may further include two wires (not shown) for carrying current for tilt control.

The pair of magnets 40 is mounted on the base 33, and each magnet 40 faces a respective one of the two sides 31a and 31b of the bobbin 31 that are parallel along the radial (i.e., tracking) direction of the optical disc. Each magnet 40 includes a respective middle region 42 and a respective pair of two side regions 41 and 43. Such regions 41, 42, and 43 have having at least portions that are parallel along the focus direction F. The side regions 41 and 43 are disposed at opposite sides of the middle region 42.

Figure 4:
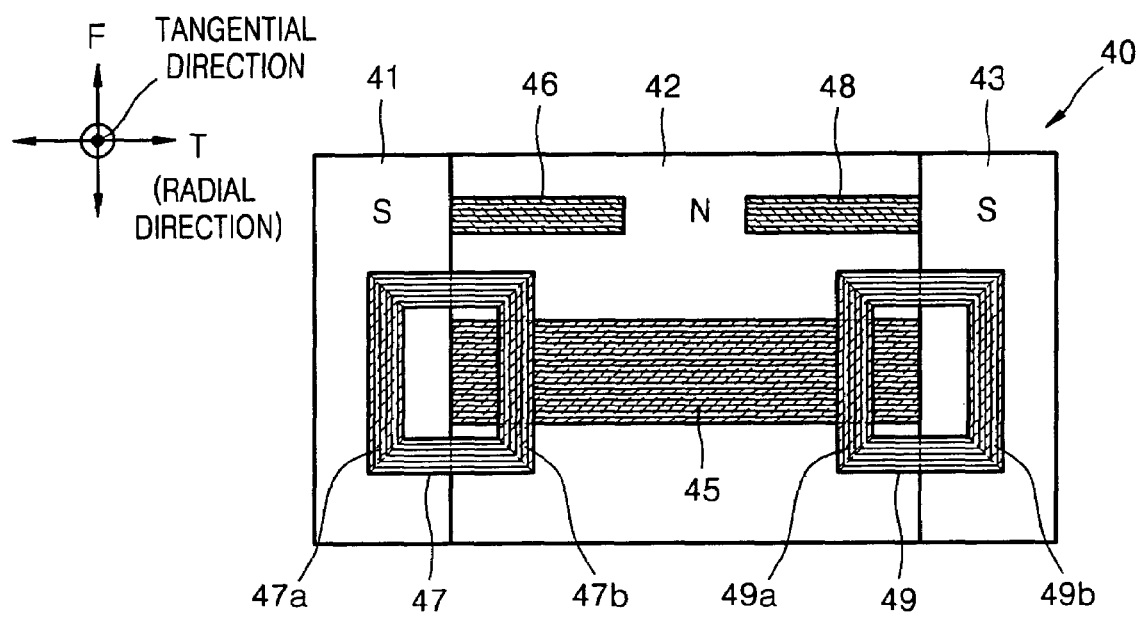
FIG. 4 is a side view of the magnetic circuit of FIG. 2.

The middle region 42 has a first magnetic polarity, and the side regions 41 and 43 each have a second magnetic polarity opposite of the first magnetic polarity. For example, when the surface of the middle region 42 facing the bobbin 31 is magnetized with an N-pole, the surfaces of the side regions 41 and 43 facing the bobbin 31 are magnetized with an S-pole, or vice versa. Referring to FIG. 4, the regions 41, 42, and 43 each have a rectangular shape for each magnet 40.

Since the size of each magnet 40 is limited by design constraints, to maximize focus sensitivity, the middle region 42 is wider along the radial direction T than the side regions 41 and 43, in one embodiment of the present invention. The width of the middle region 42 is maximized within design tolerance according to one embodiment of the present invention.

The focus coil 45 is wound around the bobbin 31 for inducing an electromagnetic force that moves the bobbin 31 in the focus direction F from interaction with the magnets 40. With the pair of magnets 40 facing the two sides 31a and 31b of the bobbin 31 along the radial direction T, two sides 45a and 45b of the focus coil 45 (indicated by oblique lines in FIG. 5) facing the pair of the magnets 40 form two effective coil portions. Generally, an effective coil portion of a coil has electromagnetic force generated thereon from interaction of current following through the coil and the magnetic field of a magnet.

The bobbin 31 moves in the focus direction F with the electromagnetic force generated from interaction between the magnetic field of the middle regions 42 of the magnets 40 and current flowing through the focus coil 45. In one embodiment of the present invention, the two sides 45a and 45b of the focus coil 45 opposing the magnets 40 each have a length corresponding to the width of the middle region 42. Focus sensitivity is increased when the width of the middle region 42 is maximized and when the length of each of the two sides 45a and 45b of the focus coil 45 is made equal to the width of the middle region 42.

Alternatively, the present invention may also be practiced when the length of each of the two sides 45a and 45b of the focus coil 45 is greater than or less than the width of the middle region 42. The present invention may also be practiced with the widths of the three magnetic regions 41, 42, and 34 being substantially equal.

The two sides 45a and 45b of the focus coil 45 have an electromagnetic force exerted thereon in the focus direction F along a central axis of the objective lens 31 such that the bobbin 31 moves in a positive or negative focus direction. Such an electromagnetic force is generated from interaction between the magnetic field of the middle regions 42 of the magnets 40 and current flowing through the focus coil 45. When the direction of such current is reversed, the bobbin 31 moves in the opposite direction. Thus, the direction of movement of the bobbin 31 is controlled by the direction of current flowing through the focus coil 45.

Figure 2:
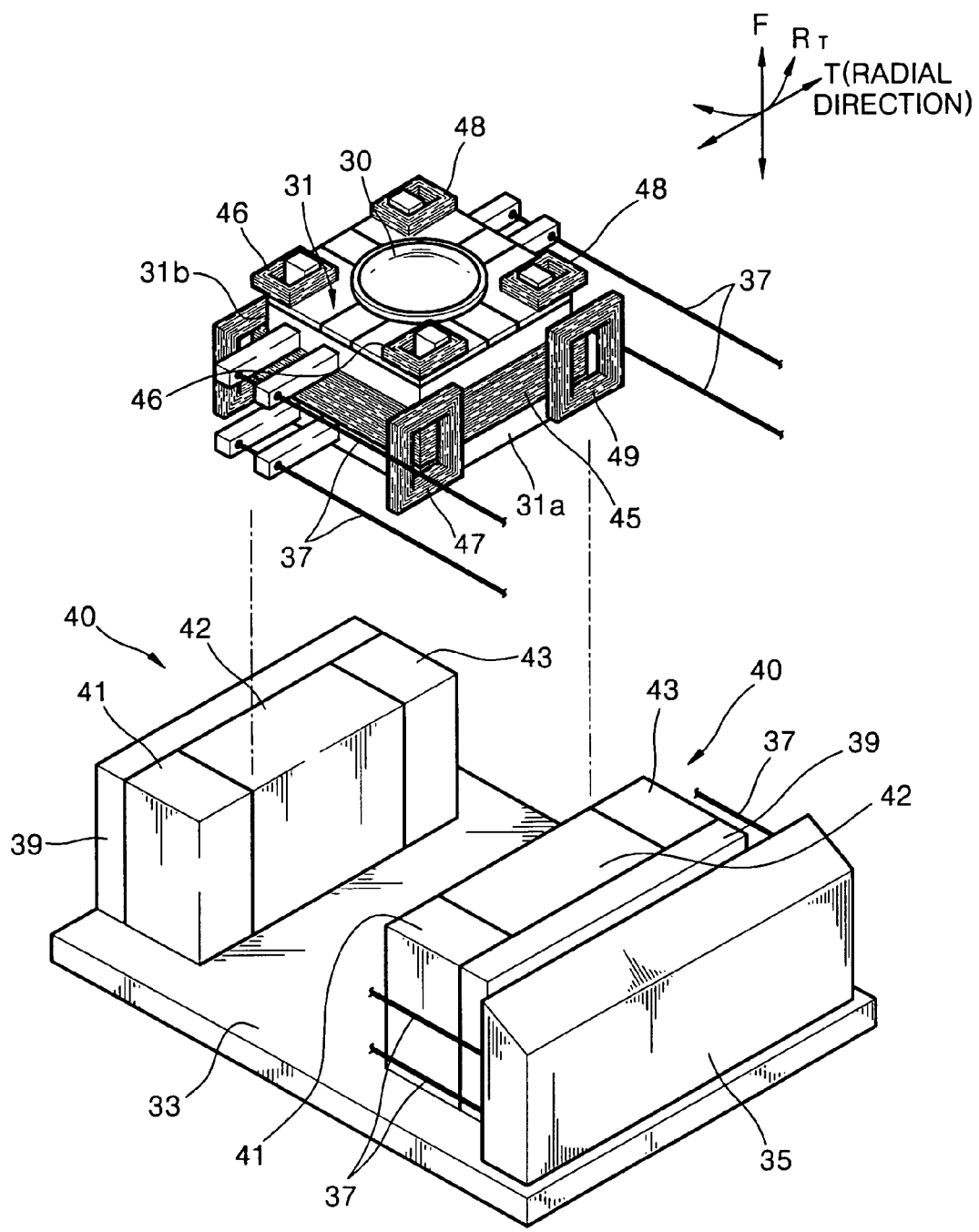
FIG. 2 is an exploded schematic perspective view of an optical pickup actuator according to a first embodiment of the present invention.
Figure 3:
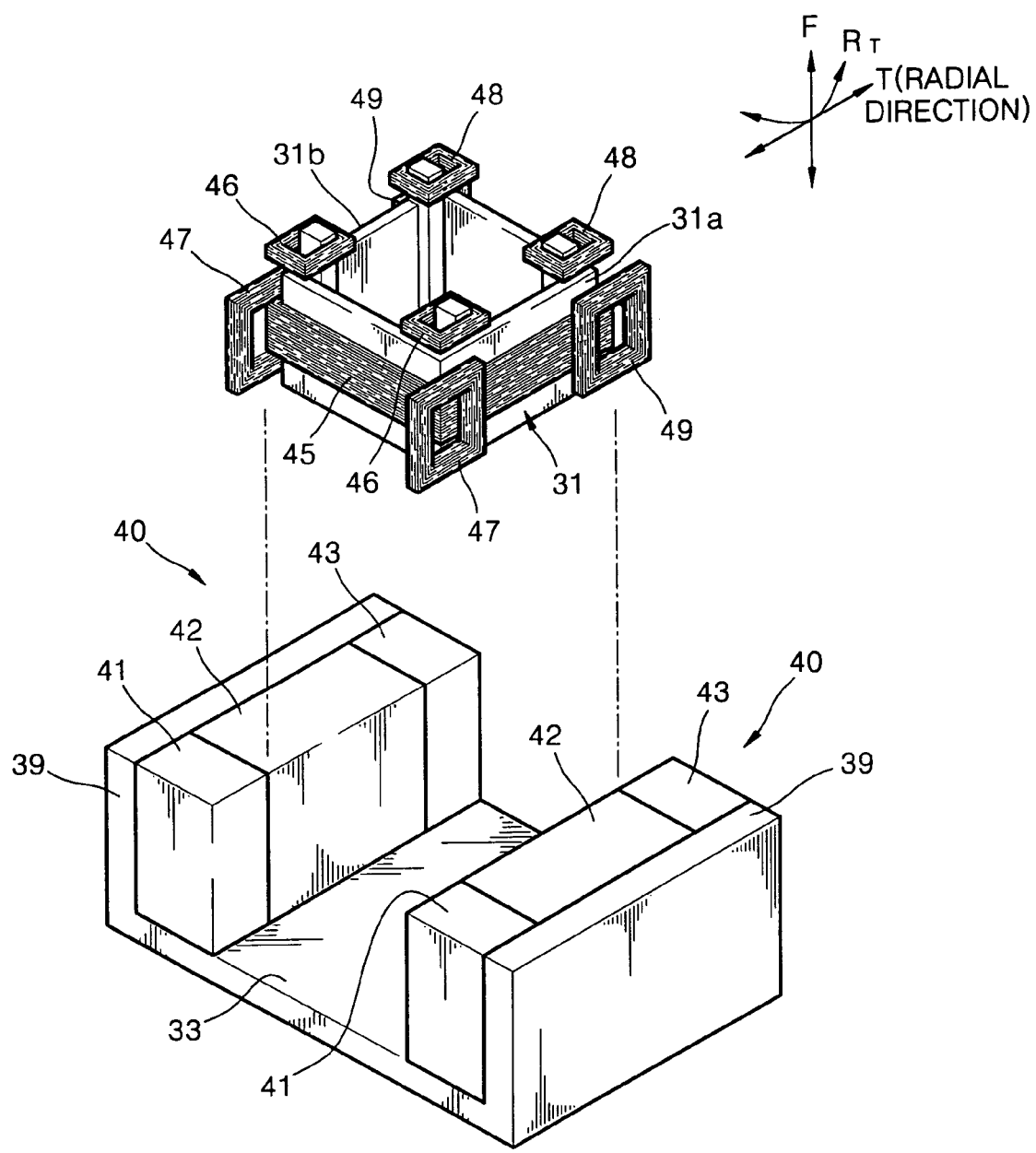
FIG. 3 is a perspective view of a magnetic circuit of the optical pickup actuator of FIG. 2.

Referring to FIGS. 2 and 3, one pair of tracking coils 47 and 49 is mounted on one side 31a of the bobbin 31, and the other pair of tracking coils 47 and 49 is mounted on the opposite side 31b. Thus, the four tracking coils 47 and 49 are used in the first embodiment of the present invention.

The basic mechanism for tracking control on the two sides 31a and 31b of the bobbin 31 is similar. A pair of tracking coils 47 and 49 is disposed on each of the two sides 31a and 31b of the bobbin 31. Referring to FIG. 4, two sides 47a and 47b of each tracking coil 47 face the side and middle regions 41 and 42 of the magnet 40, respectively, to form two effective coil portions of each tracking coil 47. Similarly, two sides 49a and 49b of each tracking coil 49 face the middle and side regions 42 and 43 of the magnet 40, respectively, to form two effective coil portions of each tracking coil 49.

The right side 47b of the tracking coil 47 and the left side 49a of the other tracking coil 49 interact with the magnetic field of the middle region 42 magnetized with the N-pole. The left side 47a of the tracking coil 47a and the right side 49b of the other tracking coil 49 interact with the magnetic field of the side regions 41 and 43, respectively, magnetized with the S-pole.

Thus, the currents flowing through the pair of tracking coils 47 and 49 are controlled to flow in opposite directions such that electromagnetic forces are applied thereon in the same direction. The tracking coils 47 and 49 are bulk coils of copper wire or fine pattern coils (FPCs), in one embodiment of the present invention. For bulk coils, the tracking coils 47 and 49 are wound directly on the bobbin 31 or are pre-wound and attached to the sides 31a and 31b of the bobbin 31. When the bulk coils are wound directly on the bobbin 31, structures (not shown) for winding the tracking coils 47 and 49 thereon are disposed on each of the sides 31a and 31b of the bobbin 31. Such structures may be made by simply modifying the bobbin 31 and thus are not shown in FIGS. 2, 3, 4, and 5.

In this manner, two sides of each of the tracking coil 47 and 49 are used as effective coil portions which is about half of each of the tracking coils 47 and 49. On the other hand, the conventional optical pickup actuator uses about a fourth of a tracking coil as an effective coil portion. Thus, the tracking coils of embodiments of the present invention provide tracking sensitivity that is at least two times that of the conventional optical pickup actuator for high sensitivity tracking.

Further referring to FIGS. 2, 3, 4, and 5, the magnetic circuit of the optical pickup actuator further includes the plurality of tilt coils 46 and 48. The tilt coils 46 and 48 have windings in at least one plane that is parallel to the focus coil 45 and that is disposed above and/or below the focus coil 45.

In the example of FIGS. 2, 3, 4, and 5, the tilt coils 46 and 48 are placed above the focus coil 45, and a pair of tilt coils 46 and 48 is disposed near each magnet 40. The present invention may also be practiced with other numbers and positions of the tilt coils. For example, the tilt coils may also be positioned above and/or below the focus coil 45 in the focus direction F.

Figure 5:
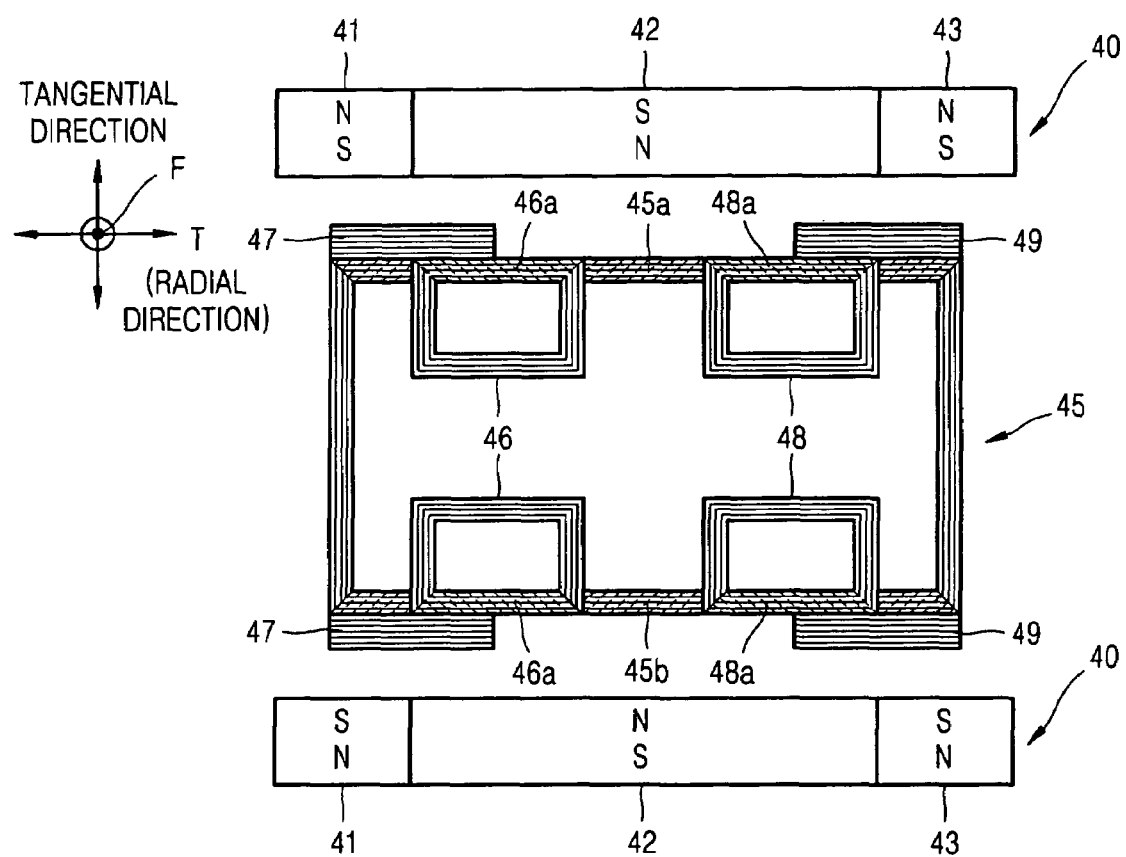
FIG. 5 is a top view of the magnetic circuit of FIG. 2.

Referring to FIG. 5, each of the tilt coils 46 and 48 has one side 46a or 48a facing the middle region 42 of a magnet 40 to form an effective coil portion. For control in a radial tilt direction $R_T$, an electromagnetic force is generated on one of the tilt coils 46 and 48 in an upward direction, and an electromagnetic force is generated on the other of the tilt coils 46 and 48 in a downward direction. Depending on the direction of current flowing through the tilt coils 46 and 48, the bobbin 31 moves in a positive or negative radial tilt direction $+R_T$ or $-R_T$. The present invention may be practiced when the four tilt coils 46 and 48 are bulk coils wound directly on the bobbin 31, pre-wound bulk coils attached to the bobbin 31, or fine pattern coils (FPCs).

In this manner, with the focus coil 45, the tracking coils 47 and 49, and the tilt coils 46 and 48, the optical pickup actuator moves the bobbin 31 along the three-axis of the focus direction F, the radial direction T, and the radial tilt direction $R_T$. Alternatively, when just the focus coil 45 and the tracking coils 47 and 49 are used, the optical pickup actuator moves the bobbin 31 along the two-axis of the focus direction F and the radial direction T. In any case, the optical pickup actuator has tracking coils 47 and 49 with two effective coil portions occupying half of each of the tracking coils 47 and 49 for high tracking sensitivity.

Optical pickup actuators according to other embodiments of the present invention are now described. Since such optical pickup actuators have substantially similar construction as the first embodiment except for the magnetic circuit, just the magnetic circuit of such optical pickup actuators are illustrated and described, without a detailed description of other elements having substantially similar structure and/or function as in the first embodiment.

Figure 6:
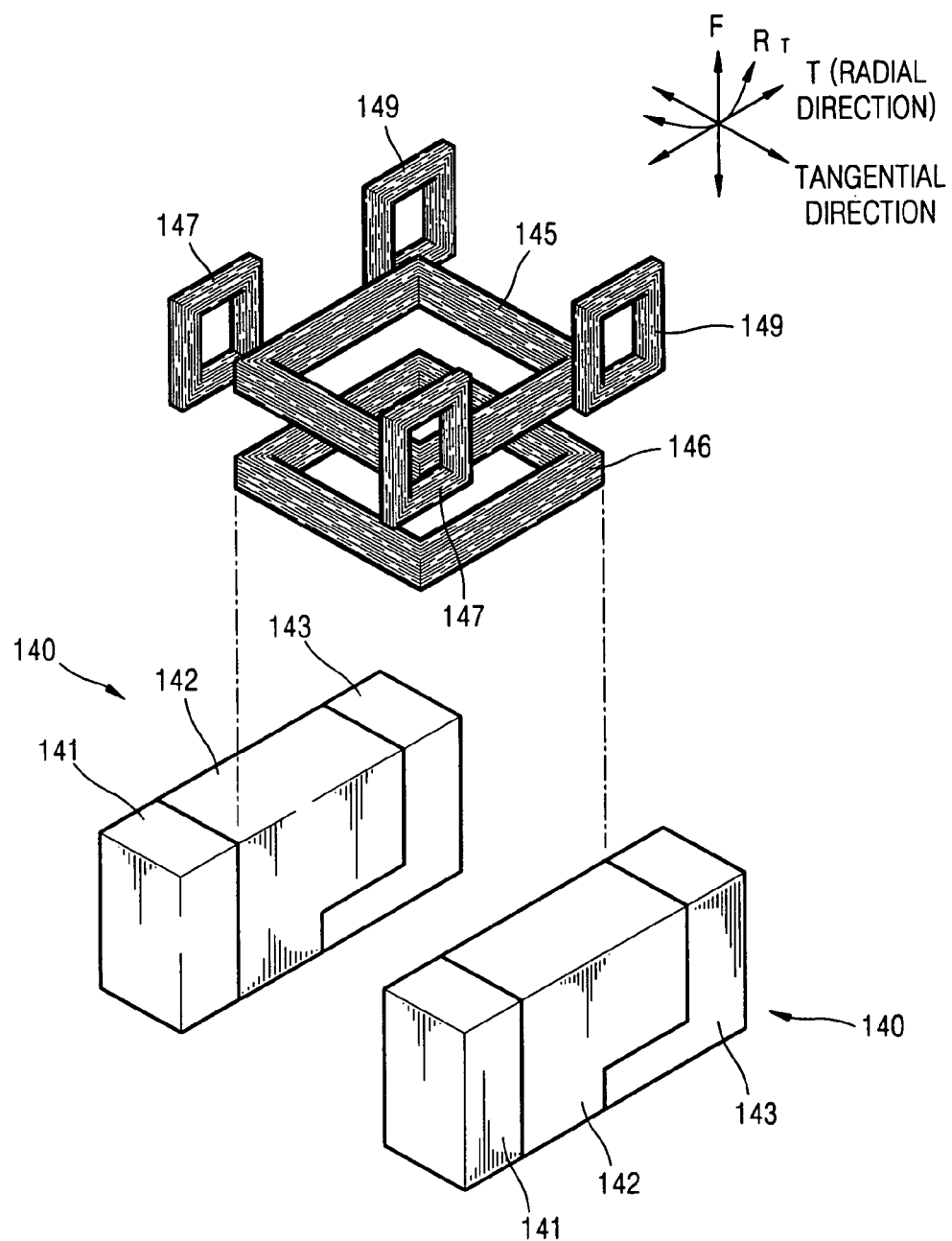
FIG. 6 is a perspective view of a magnetic circuit of an optical pickup actuator according to a second embodiment of the present invention.
Figure 7:
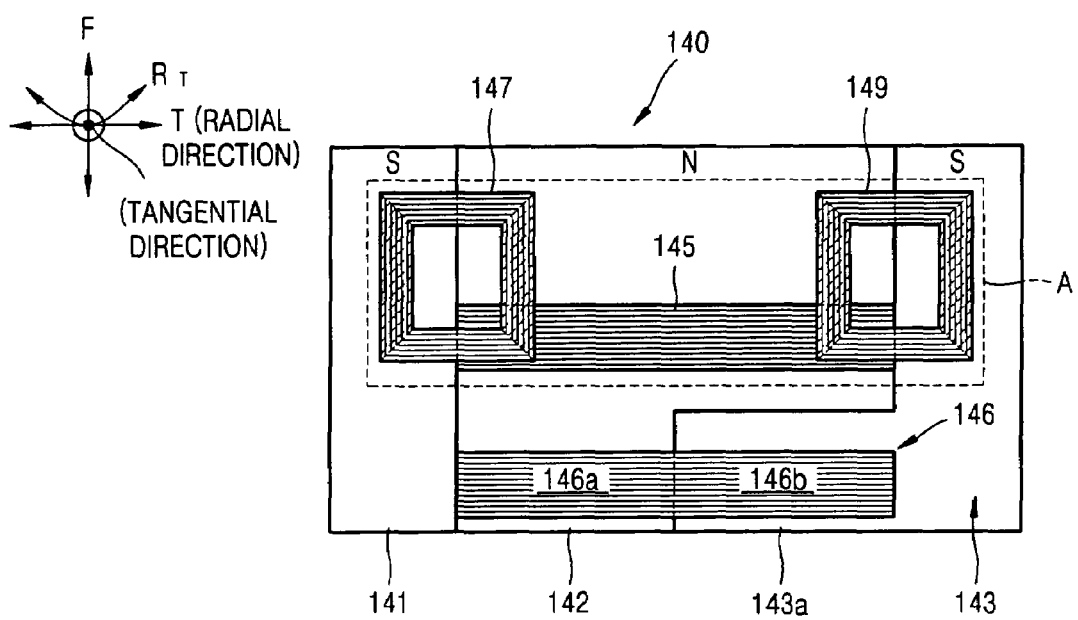
FIG. 7 is a side view of the magnetic circuit of FIG. 6.

FIG. 6 is a perspective view of a magnetic circuit of an optical pickup actuator according to a second embodiment of the present invention, and FIG. 7 is a side view of the magnetic circuit of FIG. 6. In this embodiment, the magnetic circuit includes a pair of magnets 140 disposed on the base 33 to face the two sides 31*a* and 31*b* of the bobbin 31 that are parallel along the radial direction of the optical disc. In addition, the magnetic circuit includes a focus coil 145 wound around the bobbin 31, a plurality of tracking coils 147 and 149 mounted on the two sides 31*a* and 31*b* of the bobbin 31 facing the magnets 140, and a tilt coil 146 wound around the bobbin 31 parallel to the focus coil 145.

The magnets 140 are mounted on the base 33 to face the two sides 31*a* and 31*b* of the bobbin 31 along the radial direction T of the optical disc. Each magnet 140 includes a middle region 142 and two side regions 141 and 143 having at least portions disposed parallel along the focus direction F. The sides regions 141 and 143 are disposed on opposite sides of the middle region 142.

Each magnet is divided into three magnetic poles with the middle region 42 having a first magnetic polarity, and the side regions 41 and 43 each having a second magnetic polarity opposite of the first magnetic polarity. In addition, one of the side regions 143 has an extended branch fitting into the middle portion 142 at the bottom of the magnet 140.

Figure 8A:
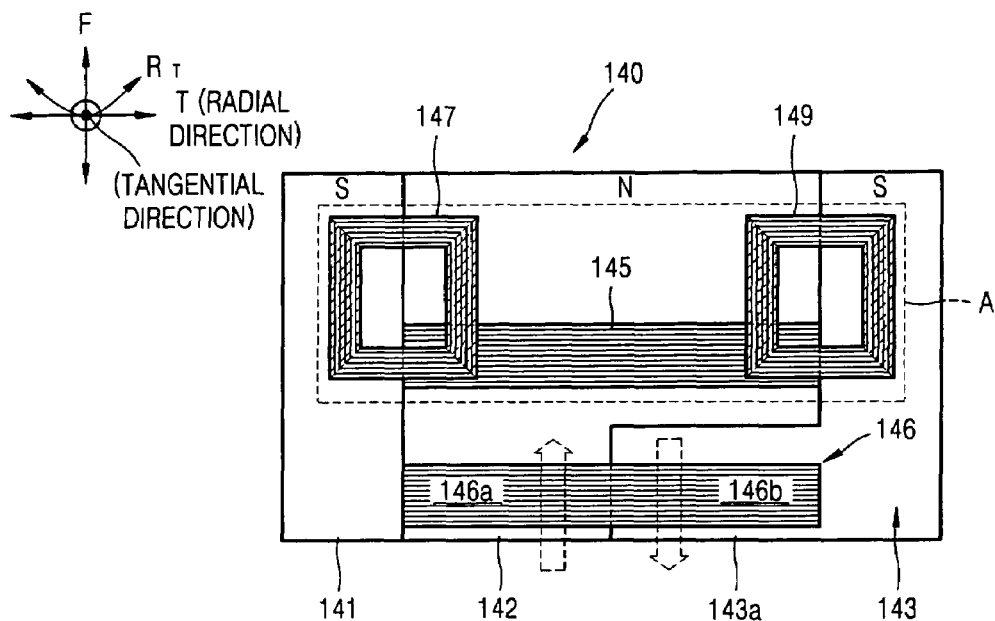
FIGS. 8A and 8B are each the side view of FIG. 7 further illustrating tilt driving in the magnetic circuit of FIG. 6.
Figure 8B:
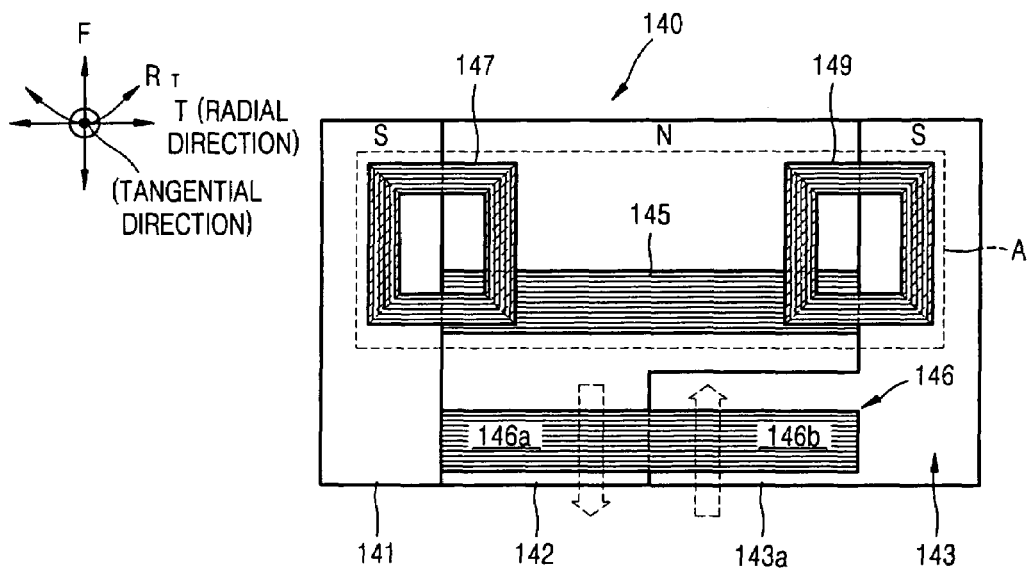

Each of magnets 140 includes a respective extended branch of one of the side regions 141 and 143 fitting into the respective middle portion 142, and the two magnets 140 are symmetrically reflected along the radial direction T as illustrated in FIG. 6. Referring to FIGS. 7, 8A, and 8B, the regions 141, 142, and 143 within a top portion A are disposed parallel along the focus direction F.

The width of the middle region 142, the length of an effective coil portion of the focus coil 145, and the arrangement of the tracking coils 147 and 149 with respect to the regions 141, 142, and 143 of the magnets 140 are substantially similar as in the first embodiment, in one embodiment of the present invention. Thus, the optical pickup actuator of the second embodiment has focus and tracking sensitivities similar to that of the first embodiment.

Comparing FIGS. 4 and 7, the locations of the focus coil 145 and the tracking coils 147 and 149 are different along the focus direction F in the second embodiment of FIG. 7 from the first embodiment of FIG. 4. The location of the tracking coils 147 and 149 and/or the focus coil 145 along the height of the magnet 140 (i.e., in the focus direction F) varies depending on the location of the tilt coil 146.

Further referring to FIG. 7, one of the side regions 141 is a simple rectangle. However, the other of the side regions 143 has a branch extension 143*a* extending into the middle region 142 along the tracking direction T. Thus, the middle region 142 is shaped to fit with the branch extension 143*a*. The single tilt coil 146 is disposed below the focus coil 145 along the focus direction F. The single tilt coil 146 also has an effective coil portion with a part 146*a* facing the middle region 142 and a part 146*b* facing the branch extension 143*a*.

In this manner, the tilt coil 146 has two effective coil portions which are the two sides of the tilt coil 146 facing the two magnets 140. While about a fourth of each of the tilt coils 46 and 48 is used as an effective coil portion in the first embodiment, about half of the tilt coil 146 is used as an effective coil portion in the second embodiment.

In addition, when the entire length of the tilt coil 146 is equal to that of the tilt coils 46 and 48, the length portion of the tilt coil 146 forming the effective coil portions in the second embodiment is larger than for the tilt coils 46 and 48 of the first embodiment, thereby increasing efficiency and sensitivity for tilt control. Furthermore, the tilt coil 146 similar to the focus coil 145 is disposed near the polarized surface of the magnet 140 for highly sensitive tilt control.

The parts 146*a* and 146*b* of the tilt coil 146 face the north-polarity of the middle region 142 and south-polarity of the extended branch 143*a* of the side region 143, respectively. Thus, the direction of the magnetic field at the part 146*a* of the tilt coil 146 is opposite to that at the other part 146*b*, and the electromagnetic forces exerted on the two parts 146*a* and 146*b* are in opposite directions.

For example, when current flows through the tilt coil 146 in one direction, electromagnetic forces act upward on the part 146*a* of the tilt coil 146 and downward on the other part 146*b*, as shown in FIG. 8A. Alternatively, when current flows through the tilt coil 146 in the opposite direction, directions of the electromagnetic forces acting on the two parts 146*a* and 146*b* are reversed as shown in FIG. 8B. With such electromagnetic forces exerted on the two parts 146*a* and 146*b*, the bobbin 131 is moved in the radial tilt direction $R_T$.

In this manner, the parts 146*a* and 146*b* of each of the two effective coil portions facing the two magnets 140 are completely used for increased sensitivity of tilt driving. The branch extension 143*a* of the side portion 143 fitting into the middle region 142 is just one example of such a second embodiment of the present invention. For example, the side region 141 (instead of 143) may have the branch extension 143*a* extending and fitting into the middle region 142.

Alternatively, one of the side regions 141 or 143 may have a branch extension extending and fitting into the middle region 142 towards the upper portion of the magnets 140. In that case, the tilt coil 146 would be located above the focus coil 145. Otherwise, one of the side regions 141 and 143 may have a first branch extension fitting into the middle region 143 toward the upper portion of the magnets, and the other of the side regions 141 and 143 may have a second branch extension fitting into the middle region toward the bottom portion of the magnets. In that case, a plurality of tilt coils 146 are formed both above and below the focus coil 145. In any case, the bobbin 131 is moved by the tilt coil(s) 146 in the radial tilt direction $R_T$ similarly as described above in reference to FIGS. 6, 7, 8A, and 8B.

Figure 9:
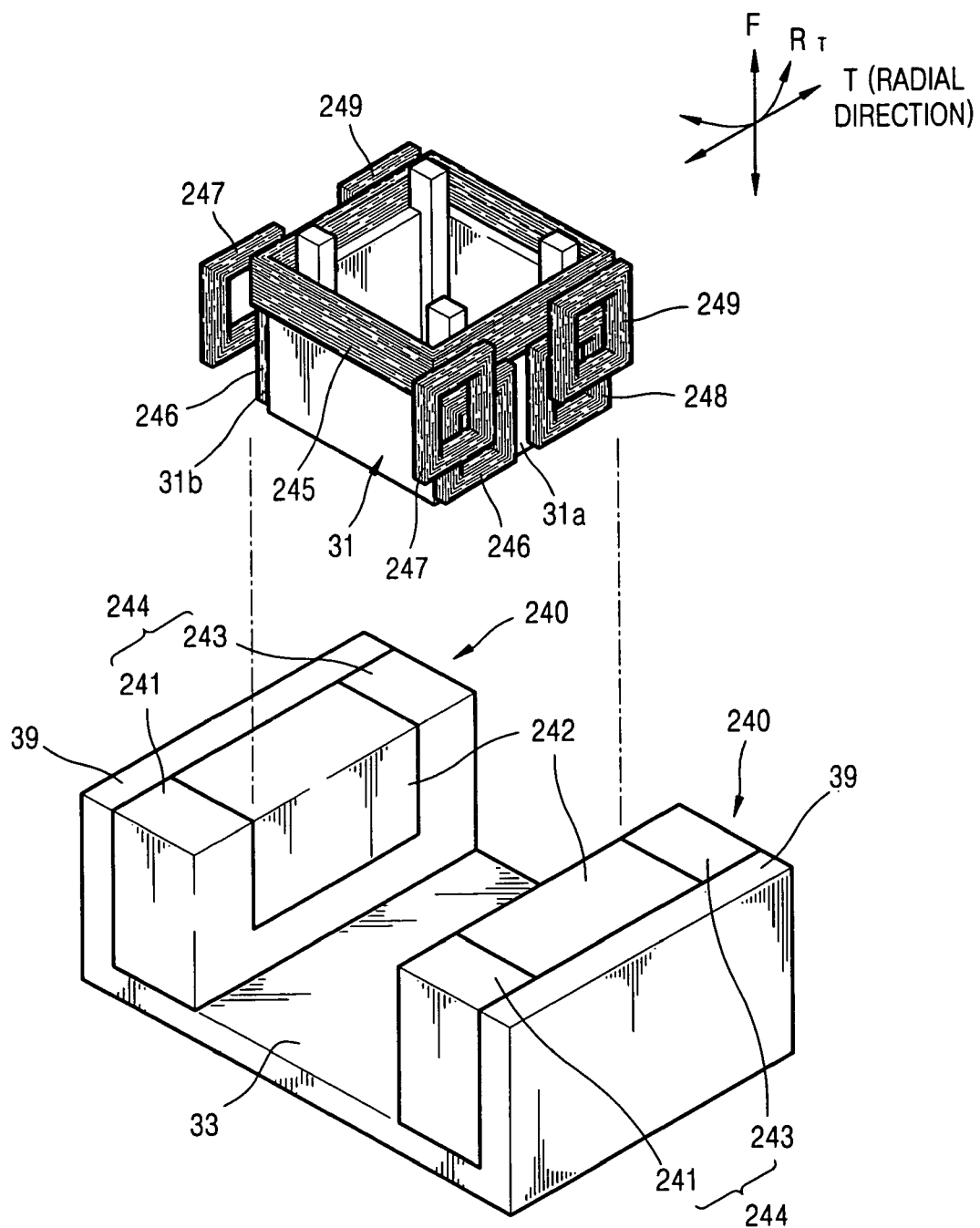
FIG. 9 is a perspective view of a magnetic circuit of an optical pickup actuator according to a third embodiment of the present invention.
Figure 10:
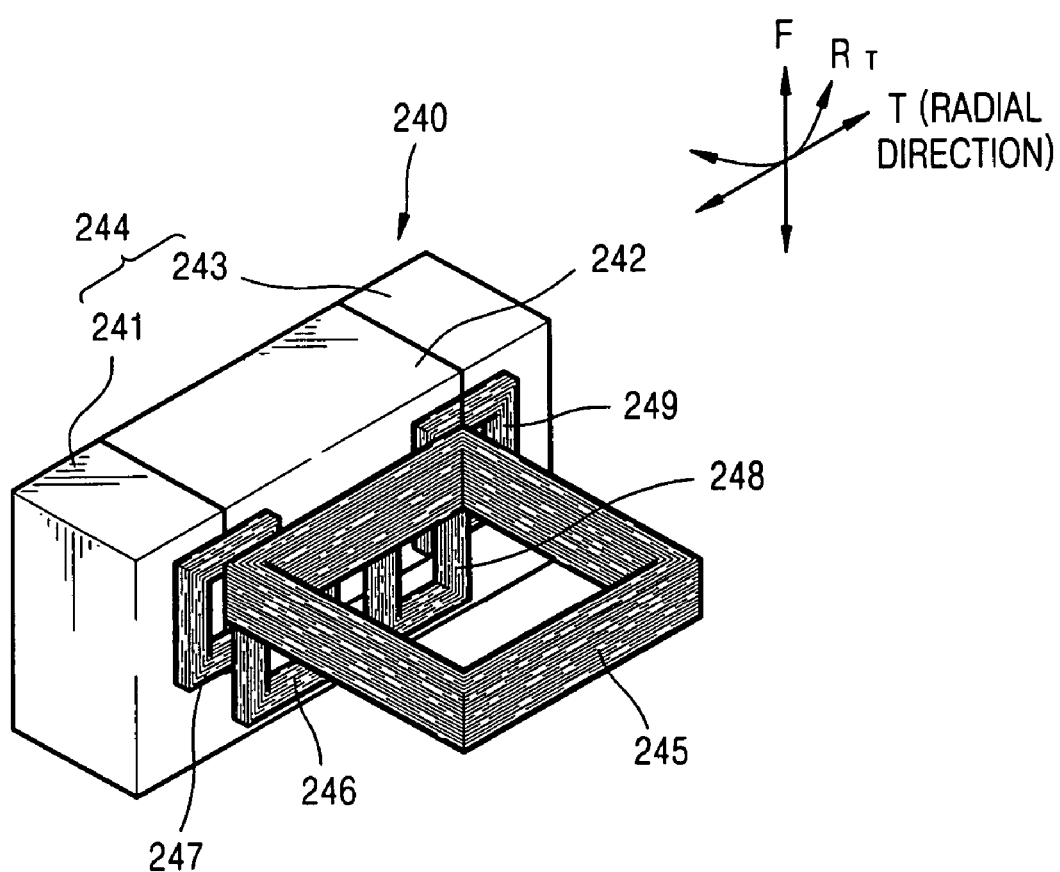
FIG. 10 is a perspective view showing a portion of FIG. 9.
Figure 11:
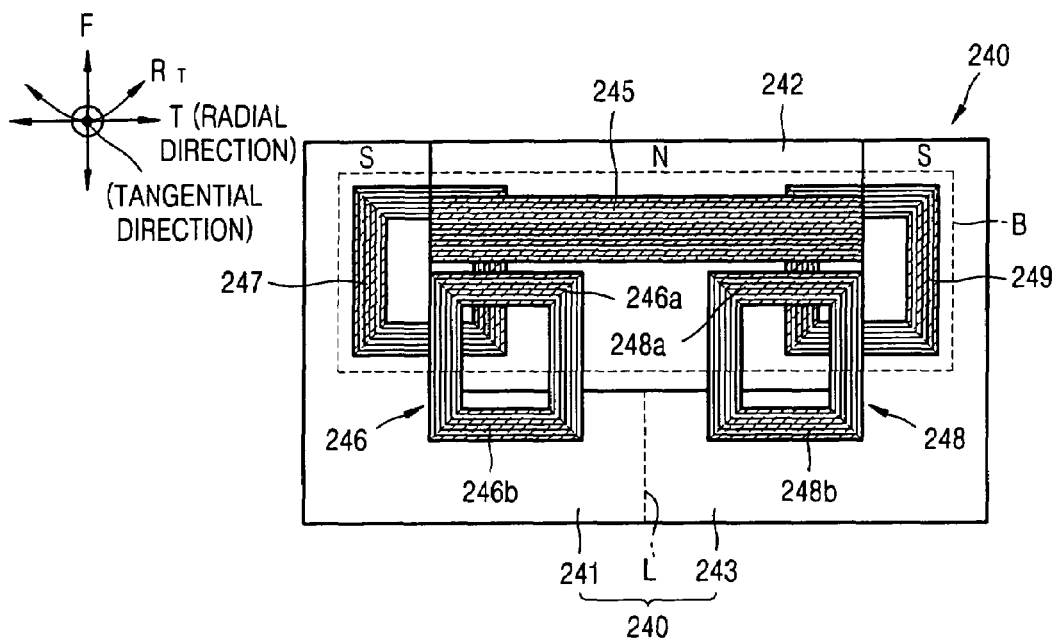
FIG. 11 is a side view of the magnetic circuit of FIG. 9.

FIG. 9 is a perspective view of a magnetic circuit of an optical pickup actuator according to a third embodiment of the present invention, and FIG. 10 is a perspective view showing a portion of FIG. 9. FIG. 11 is a side view of the magnetic circuit of FIG. 9. In the third embodiment, the magnetic circuit includes a pair of magnets 240 disposed on the base 33 to face the two sides 31a and 31b of the bobbin 31 that are parallel along the radial direction T of the optical disc.

In addition, the magnetic circuit of the third embodiment includes a focus coil 245 wound around the bobbin 31. Furthermore, the magnetic circuit includes a plurality of tracking coils 247 and 249 and a plurality of tilt coils 246 and 248 installed on each of the two sides 31a and 31b of the bobbin 31 facing the pair of magnets 140.

Each one of the magnets 240 is mounted on the base 33 to face a respective one of the two sides 31a and 31b of the bobbin 31 along the radial direction T of the optical disc. Each magnet 240 includes a middle region 242 and side regions 241 and 243 having at least portions disposed parallel to one another along the focus direction F. The upper portion of the side regions 241 and 243 are disposed at opposite sides of the middle region 242.

The middle region 242 has a first magnetic polarity, and the side regions 241 and 243 each have a second magnetic polarity opposite of the first magnetic polarity. Further referring to FIG. 11, a combined magnetic region 244 includes the side regions 241 and 243 with a common bottom area to have a squared U-shape. Alternatively, the present invention may be practiced when the combined magnetic region 244 has a common upper area to have an inverted U-shaped structure.

In FIG. 11, a dotted line L indicates the two side regions 241 and 243 that are each bent into an L-shape and a backwards L-shape, respectively. In that case, extended branches of the two side regions 241 and 243 join at the dotted line L to form the squared U-shaped structure 244. Alternatively, the present invention may be practiced when the squared U-shaped structure 244 is one integral structure.

In the third embodiment, regions 241, 242, and 243 within an upper portion B of the magnet are parallel to one another along the focus direction F and face the focus coil 245. The width of the middle region 242 is substantially equal to the length of the effective coil portion of the focus coil 245 facing the middle region 242 similarly as described for the previous embodiments. In addition, the arrangement of the tracking coils 247 and 249 with respect to the magnetic regions 241, 242, and 243 is substantially similar as in the previously described embodiments.

Comparing FIGS. 7 and 11, the arrangement of the focus coil 245 and the tracking coils 247 and 249 with respect to the upper portion B of the magnet 240 is similar to the second embodiment. Thus, the optical pickup actuator according to the third embodiment of the present invention is able to provide focus and tracking sensitivities comparable to the previously described embodiments.

Further referring to FIG. 11, the tilt coils 246 and 248 have windings parallel to those of the tracking coils 247 and 249. In the example of FIGS. 10 and 11, two tilt coils 246 and 248 are disposed opposite each magnet 240 for a total of four tilt coils 246 and 248 facing the magnets 240. However, the present invention may be practiced with other number of tilt coils. The tilt coils 246 and 248 are bulk coils in the example of FIGS. 10 and 11, but the present invention may also be practiced with FPCs (fine pattern coils) for the tilt coils 246 and 248.

In the third embodiment, a upper side 246a or 248a and a lower side 246b or 248b form the two effective coil portions for each of the tilt coils 246 and 248. Each of the tilt coils 246 and 248 has a respective upper side 246a or 248a that faces the middle region 242 of the magnet 240, and has a respective lower side 246b or 248b that faces the U-shaped structure 244.

The direction of the magnetic field at the upper sides 246a and 248a is opposite to that at the lower sides 246b and 248b. In addition, the direction of current flowing through the upper sides 246a and 248a is opposite to that through the lower sides 246b and 248b. Thus, an electromagnetic force in the same direction is exerted on the upper and lowers sides 246a and 246b of the tilt coil 246. Similarly, an electromagnetic force in the same direction is exerted on the upper and lowers sides 248a and 248b of the tilt coil 248.

Assume a current of a first direction is applied through a first pair of tilt coils 246 and 248, and a current of a second direction opposite to the first direction is applied though a second pair of tilt coils 246 and 248. In that case, an example resulting electromagnetic force is exerted upward on the first pair of tilt coils 246 and 248 and downward on the second pair of tilt coils 246 and 248, in the radial tilt direction $R_T$. If the current direction through each of the tilt coils 246 and 248 is reversed, the direction of the electromagnetic force exerted on the tilt coils 246 and 238 is reversed.

In this manner, the bobbin 31 is moved in the radial tilt direction $R_T$ in the third embodiment of the present invention. In addition, each magnet 240 is divided into two separate poles along the focus direction with the two effective coil portions of each of the tilt coils 246 and 248 facing such two polarities. Thus the efficiency of the tilt coils 246 and 248 is doubled from the embodiment using just one side of the tilt coil as an effective coil portion. Furthermore, the tilt coils 246 and 248 are disposed near the front surface of the magnet 240 where the magnetic field is strong further leading to high-sensitivity tilt driving.

To increase tracking sensitivity, the tracking coils 247 and 249 may be disposed closer to the magnets 240 than the tilt coils 246 and 248. On the other hand, to increase tilt sensitivity, the tilt coils 246 and 248 may be disposed closer to the magnets 240 than the tracking coils 247 and 249.

In the optical pickup actuators according to the first, second, and third embodiments of the present invention, the magnets 40, 140, and 240 are each a surface polarization magnet. Such a surface polarization magnet may be formed by passing current through a magnetizing coil that generates a magnetic field for magnetization of the surface of the magnet.

In addition, the magnets 40, 140, and 240 are formed using a closed-loop magnetization technique with the magnetizing coils forming a closed-loop, in one embodiment of the present invention. With such a closed-loop magnetization technique, two or more regions of magnetic fields may be generated simultaneously with similar magnitude and opposite magnetic polarities. Thus, with such a closed-loop magnetization technique, the multiple regions of the magnets 40, 140, and 240 are simultaneously magnetized with substantially similar magnitude of magnetic fields.

The magnets 40, 140, or 240 are each magnetized to generate a magnetic field of sufficient intensity from the middle region for sensitive focus control. With the closed-loop magnetization technique, the magnetic field strength from the two side regions is also formed with similar intensity as the middle region for high-sensitivity tracking control. Such intensity for the middle and side regions (or the single magnetic region 244) for the magnets 40, 140, or 240 is also amenable for high-sensitivity tilt driving.

In addition, as shown in FIGS. 2, 3, 6, and 9, each of the optical pickup actuators according to the embodiments of the present invention includes a pair of external yokes 39 mounted on the base 33. The magnets 40, 140, or 240 are each attached to a respective external yoke 39.

Each optical pickup actuator of embodiments of the present invention uses two of the four sides of the bobbin 31 (31a and 31b) for a magnetic circuit. In contrast, the conventional optical pickup actuator of FIG. 1 uses all four sides for a magnetic circuit. Thus, the optical pickup actuator according to embodiments of the present invention has significantly lower manufacturing cost with less magnets and with less complicated wiring.

Figure 12:
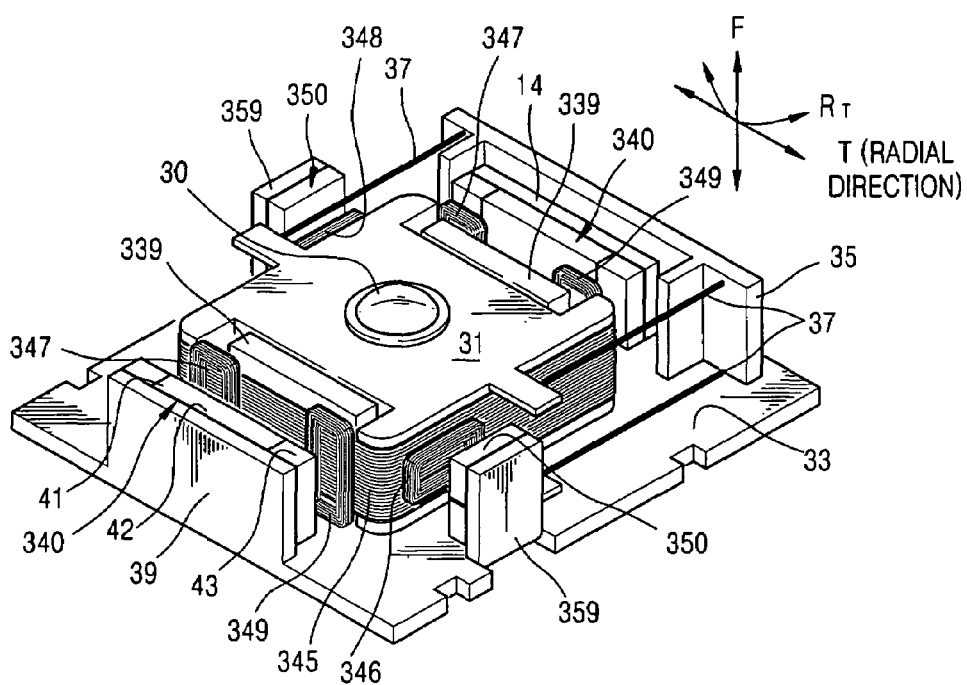
FIG. 12 is a perspective view of a magnetic circuit of an optical pickup actuator according to a fourth embodiment of the present invention.

However, the present invention may also be practiced using the four sides of the bobbin 31 according to a fourth embodiment of the present invention as illustrated in FIG. 12. Referring to FIG. 12, an optical pickup actuator includes a bobbin 31 for mounting an objective lens 30 thereon. The optical pickup actuator of FIG. 12 also includes suspension wires 37 that support the bobbin 31 to be movable with respect to a base 33 in a focus direction F, a tracking direction T, and a radial tilt direction $R_T$.

Each wire 37 has one end attached to the bobbin 31 and the other end attached to a holder 35 mounted on one side of the base 33. The wires 37 may also be used for carrying current flowing through a focus coil 345 and tracking coils 347 and 349. Wires for carrying current flowing through the tilt coils 346 and 348 are not shown in FIG. 12.

In FIG. 12, a magnetic circuit is installed on the four sides of the bobbin 31 for moving the bobbin 31. The magnetic circuit includes a focus coil 345 that is wound around the bobbin 31 for moving the bobbin 31 in the focus direction F. In addition, the magnetic circuit includes two pairs of tracking coils 347 and 349 disposed on each of two sides parallel along the radial direction T. Furthermore, the magnetic circuit includes a pair of tilt coils 346 and 348 disposed on the remaining two sides of the bobbin 31 not having the tracking coils 347 and 349.

The magnetic circuit also includes magnets 340 and 350 and yokes 39, 339, and 359 that interact with current flowing through the focus coil 345, the tracking coils 347 and 349, and the tilt coils 346 and 348 to generate electromagnetic forces for moving the bobbin 31. Here, the magnets 340 disposed on the yokes 39 to face the tracking coils 347 and 349 are used for focusing and tracking control, and the magnets 350 disposed on the yokes 359 to face the tilt coils 346 and 348 are used for tilt control. The yokes 39 and 339 are external and internal yokes, respectively, for guiding the magnetic fields used for focus and tracking control. The yokes 359 are external yokes for guiding the magnetic field used for tilt driving.

In the fourth embodiment of FIG. 12, a portion of the magnetic circuit for focusing and tracking control is substantially similar as in the first, second, and third embodiments. The remaining portion of the magnetic circuit for tilt driving differs from such previous embodiments.

In the example of FIG. 12, the magnets 340 are similar to the magnets 40 of the first embodiment of the present invention. However, the magnets 340 may also be similar to the magnets 140 or 240 of the second or third embodiments. Thus, the optical pickup actuator of FIG. 12 operates similarly to the previously described embodiments for the focus and tracking control.

When current is applied to each of the tilt coils 346 and 348, a respective electromagnetic force is exerted on the tilt coils in opposite directions. Thus, the bobbin 31 and thus the objective lens 30 are moved in the radial tilt direction $R_T$. In FIG. 12, each magnet 350 is divided into upper and lower magnetic regions magnetized with opposite polarities. The upper and lower sides of each of the tilt coils 346 and 348 form two effective coil portions for each of the tilt coils 346 and 348.

The magnets 350 are each a surface polarization magnet and magnetized by a closed-loop technique, in one embodiment of the present invention. The optical pickup actuator according to the fourth embodiment uses all four sides of the bobbin 31, and provides focus and tracking sensitivities comparable to the previously described embodiments of the present invention.

Figure 13:
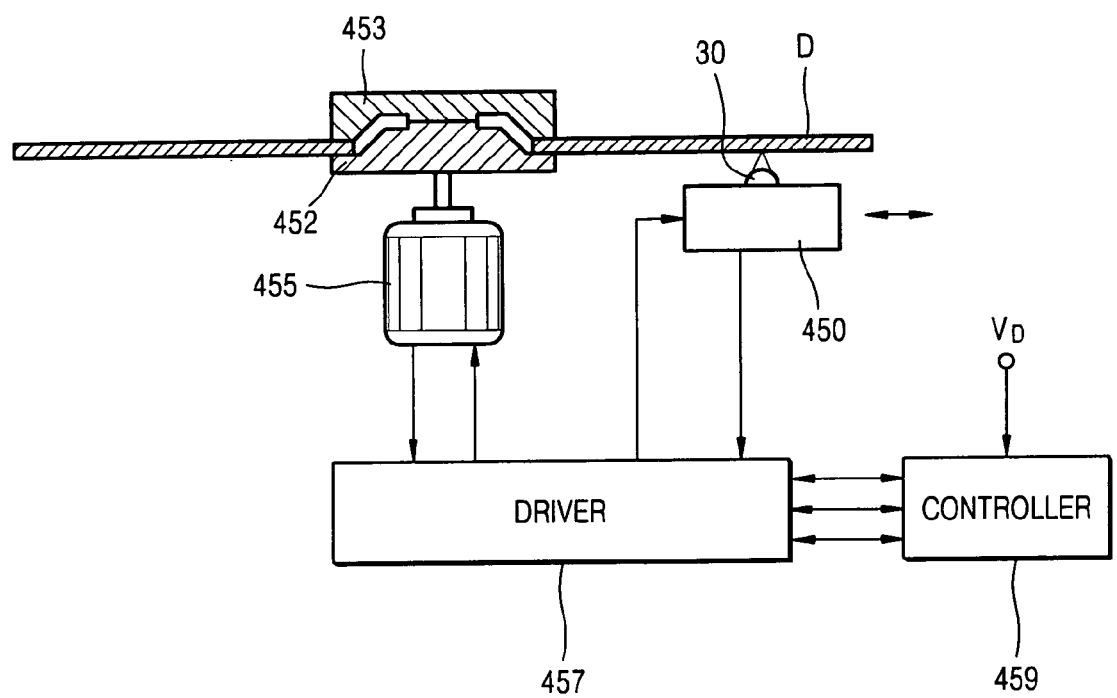
FIG. 13 is a schematic diagram of an optical disc drive including the optical pickup actuator according to above embodiments of the present invention.

FIG. 13 is a schematic diagram of an optical disc drive including the optical pickup actuator of the previously described embodiments of the present invention. The optical disc drive includes an optical pickup 450 for recording and/or reproducing information on/from an optical disc D while moving in the radial direction of the disc drive.

The optical disc drive also includes a spindle motor 455 that spins the optical disc D and a driver 457 that drives the spindle motor 455 and the optical pickup 450. The optical disc drive further includes a controller 459 that controls focus, tracking, and/or tilt driving of the optical pickup 450. In FIG. 13, reference numerals 452 and 453 denote a turntable and a clamp for chucking the optical disc D, respectively.

The optical pickup 450 includes an optical system with an objective lens 30 that focuses a light beam onto the optical disc D, and the optical pickup actuator moves the objective lens 30. The optical pickup actuator is implemented in accordance with the previously described embodiments of the present invention.

A light beam reflected from the optical disc D is detected by a photodetector of the optical pickup 450 and photoelectrically converted into an electrical signal sent to the controller 459 through the driver 457. The driver 457 controls the rotation speed of the spindle motor 455, amplifies the detected electrical signal from the optical pickup, and drives the optical pickup 450. The controller 459 sends focus servo, tracking servo, and/or tilt servo commands, which are adjusted based on signal(s) received from the driver 457, back to the driver 457 that controls the optical pickup for focus, tracking, and/or tilt servo operations.

The present invention has been particularly shown and described with reference to exemplary embodiments thereof. It will be understood by those of ordinary skill in the art that various changes in form and details may be made therein without departing from the spirit and scope of the present invention as defined by the following claims.

Thus, the foregoing is by way of example only and is not intended to be limiting. For example, the present invention has been described for focus, tracking, and/or tilt control of an optical pickup actuator within an optical disc drive. However, the embodiments of the present invention may also be used for focus, tracking, and/or tilt control of any other types of pickup actuators within any other types of disc drives. Furthermore, any numbers or shapes of structures illustrated and described herein are by way of example only.

The present invention is limited only as defined in the following claims and equivalents thereof.

What is claimed is:

1. A pickup actuator of a disc drive, the pickup actuator comprising:
   a pair of magnets, each facing a respective side of a bobbin and having a middle region with a first polarity and side regions with a second polarity opposite of the first polarity; and
   a plurality of tracking coils disposed on the respective sides of the bobbin facing the magnets, each tracking coil having two effective coil portions, one of the effective coil portions facing the middle region of a magnet, and the other of the effective coil portions facing one of the side regions of the magnet;

wherein at least one of the side regions of a magnet has an extended branch fitting into the middle region of the magnet.

2. The pickup actuator of claim 1, further comprising:

a tilt coil wound around the bobbin and having two effective coil portions, each having a first part facing the extended branch and a second part facing the middle region adjacent the extended branch.

3. The pickup actuator of claim 1, wherein the side regions each have an extended branch that join to form a common area of a U-shaped structure.

4. The pickup actuator of claim 3, further comprising:

a plurality of tilt coils disposed on the respective sides of the bobbin facing the magnets, each tilt coil having two effective coil portions, one of the effective coil portions facing the middle region of a magnet, and the other of the effective coil portions facing the common area of the U-shaped structure of the magnet.

5. The pickup actuator of claim 4, wherein the tilt coils are disposed closer to a magnet than the tracking coils at a side of the bobbin facing the magnet.

6. The pickup actuator of claim 4, wherein the tilt coils are disposed further from a magnet than the tracking coils at a side of the bobbin facing the magnet.

7. A pickup actuator of a disc drive, the pickup actuator comprising:

a pair of magnets, each facing a respective side of a bobbin and having a middle region with a first polarity and side regions with a second polarity opposite of the first polarity;

a plurality of tracking coils disposed on the respective sides of the bobbin facing the magnets, each tracking coil having two effective coil portions, one of the effective coil portions facing the middle region of a magnet, and the other of the effective coil portions facing one of the side regions of the magnet;

a pair of tilt magnets facing remaining sides of the bobbin; and a pair of tilt coils each disposed on a respective one of the remaining sides of the bobbin and having effective coil portions in interaction with a respective one of the tilt magnets.

8. A disc drive comprising:

a pickup that reproduces and/or records information on an information storage medium;

a servo that controls movement of the pickup; and a pickup actuator that moves the pickup according to control by the servo, the pickup actuator including:

a pair of magnets, each facing a respective side of a bobbin and having a middle region with a first polarity and side regions with a second polarity opposite of the first polarity; and a plurality of tracking coils disposed on the respective sides of the bobbin facing the magnets, each tracking coil having two effective coil portions, one of the effective coil portions facing the middle region of a magnet, and the other of the effective coil portions facing one of the side regions of the magnet;

wherein at least one of the side regions of a magnet has an extended branch fitting into the middle region of the magnet.

9. The disc drive of claim 8, wherein the pickup actuator further includes:

a tilt coil wound around the bobbin and having two effective coil portions, each having a first part facing the extended branch and a second part facing the middle region adjacent the extended branch.

10. The disc drive of claim 8, wherein the side regions each have an extended branch that join to form a common area of a U-shaped structure.

11. The disc drive of claim 10, wherein the pickup actuator further includes:

a plurality of tilt coils disposed on the respective sides of the bobbin facing the magnets, each tilt coil having two effective coil portions, one of the effective coil portions facing the middle region of a magnet, and the other of the effective coil portions facing the common area of the U-shaped structure of the magnet.

12. The disc drive of claim 11, wherein the tilt coils are disposed closer to a magnet than the tracking coils at a side of the bobbin facing the magnet.

13. The disc drive of claim 11, wherein the tilt coils are disposed further from a magnet than the tracking coils at a side of the bobbin facing the magnet.

14. The disc drive of claim 8, wherein the pickup actuator further includes:

a pair of tilt magnets facing remaining sides of the bobbin; and a pair of tilt coils each disposed on a respective one of the remaining sides of the bobbin and having effective coil portions in interaction with a respective one of the tilt magnets.

15. The pickup actuator of claim 1, wherein the regions of the magnet are each rectangular shaped with the side regions disposed at opposite sides of the middle region along a radial direction of the disc drive.

16. The pickup actuator of claim 1, further comprising:

a base having the magnets mounted thereon;

an objective lens mounted on the bobbin for the disc drive that is an optical disc drive; and a suspension for supporting the bobbin that is movable with respect to the base.

17. The pickup actuator of claim 1, further comprising:

a focus coil wound around the bobbin and having two effective coil portions each facing the middle region of a respective one of the magnets.

18. The pickup actuator of claim 17, wherein the width of each effective coil portion of the focus coil is substantially equal to the width of the middle region of the respective one of the magnets.

19. The pickup actuator of claim 17, further comprising:

a plurality of tilt coils wound in at least one plane that is parallel to the focus coil and that is upward and/or downward from the focus coil, each tilt coil having an effective coil portion facing the middle region of one of the magnets.

20. The disc drive of claim 8, wherein the regions of the magnet are each rectangular shaped with the side regions disposed at opposite sides of the middle region along a radial direction of the disc drive.

21. The disc drive of claim 8, wherein the pickup actuator further includes:

a base having the magnets mounted thereon;

an objective lens mounted on the bobbin for the disc drive that is an optical disc drive; and a suspension for supporting the bobbin that is movable with respect to the base.

22. The disc drive of claim 8, wherein the pickup actuator further includes:
a focus coil wound around the bobbin and having two effective coil portions each facing the middle region of a respective one of the magnets.

23. The disc drive of claim 22, wherein the width of each effective coil portion of the focus coil is substantially equal to the width of the middle region of the respective one of the magnets.

24. The disc drive of claim 22, wherein the pickup actuator further includes:
a plurality of tilt coils wound in at least one plane that is parallel to the focus coil and that is upward and/or downward from the focus coil, each tilt coil having an effective coil portion facing the middle region of one of the magnets.

* * * * *